United States Patent [19]
Wilbert et al.

[11] 3,775,227
[45] Nov. 27, 1973

[54] PIGMENTED POLYMERIC ARTIFICIAL FLORAL PRODUCT SUBSTRATES WITH IMPARTED FRAGRANCE ESSENTIAL OIL OF LONG DURATION

[76] Inventors: Godfrey Wilbert, Seminary Hill Rd., Carmel, N.Y. 10512; Thomas Brown, 3767 South Park Ave., Blasdell, N.Y. 14219

[22] Filed: Feb. 20, 1971

[21] Appl. No.: 114,351

Related U.S. Application Data

[63] Continuation-in-part of Ser. No. 864,184, Oct. 6, 1969, Pat. No. 3,567,119, which is a continuation-in-part of Ser. No. 832,538, May 2, 1969, abandoned.

[52] U.S. Cl. ............... 161/30, 117/138.8, 117/161, 161/21, 161/22, 161/25, 161/27, 161/31, 239/634, 239/44, 252/522, 260/29.6 R, 260/29.6 XA, 260/29.6 TA, 260/29.7 R
[51] Int. Cl. ...... A01n 3/00, A41g 1/00, A47g 33/04
[58] Field of Search ..................... 117/138.8, 161; 161/21, 22, 25, 27, 30, 31; 239/634, 44; 252/522; 260/29.6 R, 29.6 XA, 29.6 TA, 260/29.7 R

[56] References Cited
UNITED STATES PATENTS

| | | | |
|---|---|---|---|
| 3,567,119 | 3/1971 | Wilbert et al. | 239/6 |
| 3,505,432 | 4/1970 | Neuwald | 260/93.7 |
| 3,438,894 | 4/1969 | Van Stoesser | 252/1 |
| 3,310,472 | 3/1967 | Kohl | 252/522 |
| 3,216,882 | 11/1965 | Feldt | 161/109 |
| 3,655,129 | 4/1972 | Seiner | 239/60 |

FOREIGN PATENTS OR APPLICATIONS

| | | |
|---|---|---|
| 698,411 | 10/1967 | Belgium |
| 1,169,656 | 11/1969 | Great Britain |
| 834,566 | 3/1952 | Germany |
| 1,493,743 | 9/1967 | France |
| 1,484,697 | 6/1967 | France |
| 78,308 | 7/1962 | France |
| 592,956 | 5/1959 | Italy |

*Primary Examiner*—Shep K. Rose
*Attorney*—Frank S. Chow

[57] ABSTRACT

Novel methods for imparting to polymeric products such as artificial flowers, fruits, vegetables, trees and shrubs, their characteristic fragrance or odor are described. Products that emit a natural-like and readily detectable pleasant fragrance, of long duration, are prepared by the application to the manufactured article of a polyolefin or copolymer emulsion containing a variety of essential components. The entire processing is accomplished at ambient or slightly elevated temperatures.

4 Claims, No Drawings

PIGMENTED POLYMERIC ARTIFICIAL FLORAL PRODUCT SUBSTRATES WITH IMPARTED FRAGRANCE ESSENTIAL OIL OF LONG DURATION

This application is a continuation-in-part of application Ser. No. 864,184 filed Oct. 6, 1969 now U.S. Pat. No. 3,567,119 which is in turn a continuation-in-part of application Ser. No. 832,538 filed May 2, 1969 now abandoned.

Improved methods are described for imparting to injection molded polyolefin products, or plastisol products that have been molded or cast, an aggreeable natural-like fragrance. The injection molded products such as artificial flowers are usually manufactured with polyethylene, while the molded or cast products, such as artificial fruits and vegetables are usually manufactured with plastisols (mixtures of resins, such as polyvinylchloride and plasticizers).

According to The Importer (p. 79, Vol. XIV No. 5, Jan. 1970) the U. S. value of imported artificial flowers, fruits, vegetables and shrubs was in excess of 41 million dollars for 1968. At the retail sales level it is estimated that this value would be well over 100 million dollars. The aesthetic value of these products can be substantially enhanced by imparting, in a practical and economical manner, a natural-like fragrance of long lasting duration. Properly accomplished, consumer reception, for example, to an artificial rose or carnation with a simulated natural-like fragrance that is pleasing and readily detectable for periods of ten months to one year, is extremely favorable.

The novel use of emulsion coating for certain products has been described in U. S. Pat. application Ser. No. 864,184. However, the present invention describes details for the preparation of improved emulsions for coatings of specific products. Furthermore, it describes additional components that are incorporated in the preparation of the emulsion prior to coating a specific polymeric product. As has been described in the aforementioned copending application Ser. No. 864,184, the significance and importance of the use of antioxidants and ultraviolet radiation absorbers to protect the fragrance compound or mixtures during the preparation of the emulsion and after the coating has dried, continues to be desirable and necessary.

Aqueous polyethylene or copolymer emulsions have been selected as the vehicles for incorporating the fragrance compound or mixtures. Although organic solvent emulsions suspensions or solutions may also be used, the special safety and time requirements to evaporate the organic solvent and a slight solvent residual solvent odor are undesirable factors. In addition to aqueous polyethylene or copolymer emulsions being relatively inexpensive, emulsions containing low density polyethylene possess certain characteristics that dictate their use. Low density polyethylene has the requisite permeability to the fragrance vapors. It exhibits this vapor or gas transmission to a greater degree than high density polyethylene and many other polymers (Drug and Cosmetic Industries, Aug. 1970, p. 68, 69 and 113–116). Aqueous latex emulsion, vinyl chloride-acrylic latex emulsion, butadiene-acrylonitvile polymer emulsion, W. R. Grace & Company's PVDC, Daran X-8000, polyethylene emulsion plus styrene and maleic anhydride, vinyl acetate-ethylene co-polymer emulsion have been screened with various fragrance compounds or mixtures and determined to be acceptable, as described in Example 4, and possess certain advantages as vehicles for incorporating the aforementioned fragrances. However, in general, the aqueous polyethylene or copolymer emulsions have distinct advantages.

The fragrance compounds or mixtures are incorporated into the polymeric emulsions at ambient or slightly elevated temperatures. Although higher temperatures may be used, it was determined that an emulsion of the required consistency could be attained at 50°C or lower, with about 15 to 30 minutes heating above ambient temperature required. Fragrance emulsion concentrations can vary from 1 to 45 percent with 5 to 12 percent being the usual concentration range. The concentration of polymer or copolymers in the emulsion can vary from 10 to 65 percent with concentrations of 15 to 25 percent being preferred.

In order to improve the adhesion of the dried emulsion applied, as for example, to the injection molded polyethylene flower petals, the application of an adhesive precoat, prior to the application of the emulsion coating has been found to be effective. Since adhesion to a polyethylene substrate is difficult to achieve, only specific adhesives can accomplish the desired result. Of the numerous proprietary and non-proprietary adhesives tested, such as nitrile latex, vinyl latex, vinyl acetate-ethylene copolymer, chlorinated polyolefins, etc., only a few possessed the necessary adhesion to the substrate and the tack or base to adequately improve the adhesion of the dried polymeric emulsion coating containing the other components, to the injection molded, cast or film-formed product. It was also determined, just as for the case of cationic polymeric emulsions, those adhesives having pH's below about 4 had the least desirable adhesive properties. In order to eliminate the dual operations required to first precoat a substrate with a specific adhesive, dry the adhesive and then emulsion coat over the dried adhesive, it was demonstrated that a mixture of the aqueous adhesive emulsion and the aqueous polyethylene or polyethylene copolymer emulsion could be employed with satisfactory results. For such mixtures the ratio of adhesive emulsion to polyethylene or polyethylene copolymer emulsion may be in the range ratio of 1:10 to 10:1 parts by weight with a ratio of about 1:5 to 5:1 being preferred. Another important criteria for an adhesive or for that matter any polymeric emulsion, is the absence of any residual odor that may well interfere with the fragrance odor being continually emitted from the coated substrate.

Other components of the polymeric emulsions, containing the fragrance compound or mixtures are short length fiber glass or asbestos. These components perform the necessary function of minimizing the cracking and disintegration of the dried emulsion coating. In addition they increase the void spaces in the dried polymeric coating and permit improved permeation of the fragrance vapor through the coating. Concentrations of these components in the emulsion may vary between 0.25 to 6 percent with 0.5 to 4 percent being the preferred concentrations.

A novel aspect of this invention is the fact that the use of anionic and nonionic type aqueous polymeric emulsions, especially polyethylene or polyethylene copolymer aqueous emulsions, for coating a polyolefin or plastisol substrate, result in a dried coating that has the requisite adhesive qualities. In addition the dried coating retains the original fragrance odor for longer periods. Cationic type aqueous polymeric emulsions usually result in a dried coating that flakes or peels off the substrate quite readily. Cationic type emulsions usually possess a characteristic odor of their own which initially interferes with the fragrance odor. However, cationic emulsions may be used.

This invention also demonstrates that the incorporation in the polymeric aqueous emulsions of such additives as clays (finely divided hydrated aluminum silicate), montmorillonite, bentonite, fuller's earth, aluminum oxide-silicon dioxide, ceramic tale, silicon dioxide, diatomaceous earth (diatomite, synthetic hydrous calcium silicabe), calcium carbonate (precipitabed chalk), barium sulfate, etc.; all provide to a varying degree, because of their surface (less than 1 micron to 50 microns in diameter), absorbent areas for the fragrance essential oils. These absorbents when used in the polymeric emulsion provide an excellent "platform" for the gradual vaporization of the fragrance essential oils. These additives also, in many cases, give the aqueous polymeric emulsions bulk and afford good gelling properties. The list of absorbents is not intended to be limiting, since many other precipitated or natural inorganic compounds or mixtures could very easily be substituted. The concentrations of absorbents that may be added to the polymeric emulsions may vary between 0.25 to 10 percent with 0.5 to 3 percent being preferred. An embodiment of this invention is the fact that an essentially dry mixture, containing, as an illustration, one part of synthetic hydrous calcium silicate to 4 parts of a fragrance essential oil, provides a convenient method for absorbing the essential oil and then incorporating this dry mixture into the polymeric emulsion. The use of these absorbents also create additional voids in the dried polymeric coating. The small absorbent particles, containing the fragrance oil and other additives also eventually become coated with the collodial particles of the polymers that constitute the original emulsion.

The significant factors that contribute to the creation of polyethylene injection molded flowers or blow molded fruits or cast or molded plastisol fruits as well as vegetables, shrubs and trees, with a consumer's acceptable natural-like fragrance odor of long duration have been disclosed. These factors are summarized: the use of polyethylene or copolymer nonionic, cationic or aniomic emulsions as vehicles to incorporate the appropriate fragrance essential oil or oils as well as the purposeful use of other additives such as antioxidants, ultra-violet radiation absorbers; absorbents with extremely large surface areas; adhesives that are used to precoat the substrate, or may be mixed in the proper ratios with the polymeric emulsion or may be used as the vehicle themselves and the use of fillers such as short strand fiber glass or asbestos. The significant contribution of each additive used, so that the complete mixture has all the desired attributes for the applications already described is evident from the data detailed in the following examples.

The additional variations and varieties of additives that may also be employed will be recognized by one versed in this art. The specific polymeric emulsions and additives that have been described are not meant to be limiting.

It is emphasized that the methods and procedure described in this invention permit the processing of heat sensitive fragrance essential oils at temperatures sufficiently low enough to minimize degradation or alteration of these compounds giving assurance that the processed consumer product will possess desirable and acceptable olfactory characteristics. The composition of the polymeric emulsions used to apply to the previously described substrates, also makes it economically practical to enhance the aesthetic value of a wide variety of injection or blow molded flower and fruits, etc., or plastisol cast fruits and vegetables. The use of the prepared emulsions and their application makes possible their use on an infinite variety of products in assorted colors, without the restriction of manufacturing only a few of an innumerable variety of the products already described.

EXAMPLE 1

A. To 1.20 grams of rose oil (1) was added 0.08 grams Plastanox 1161 (2), 0.08 grams Plastanox LTDP (3) and 0.08 grams of Cyasorb U.V. 531 (4). The mixture was warmed, with agitation at about 40°–45°C, until solution was effected. To this mixture was then added to 18.00 grams of a nonionic polyethylene aqueous emulsion (5) and stirring continued for about 4 hours, at ambient temperature, until a gel formed. To this was then added 0.10 grams of fiber glass (1/16 to 1/4 inch fibers) followed by a sufficient quantity of white and yellow inorganic pigments to give a predetermined light yellow gel. A small quantity of the gel was then applied to the surface of a 3 × 3 inch polyethylene film and permitted to dry for 7 days at ambient temperatures. Observations were then made to determine the extent of the shrinkage of the dried coating, radial cracking and the ability of the coating to adhere to the polyethylene film and the odor. Then 4.0 grams of the gelled emulsion were inserted into the lower petals of a white rose with a yellowish tinge of color. This rose was then identified as A and retained for olfactory testing.

B. A similar procedure to that described for A was followed with the exception that 0.10 grams of calcium silicate (6) were added to the emulsion mixture of the rose oil containing the antioxidants and the ultra-violet light absorber. Then 4.0 grams of the finished gelled emulsion was inserted into the center petals of a white artificial rose, then identified as B and retained for olfactory testing. A small quantity was also coated on a 3 × 3 inch polyethylene film and dried for 7 days.

Similar experiments were made as described in (B) substituting two different kaolins (7) (8), fullers earth (9), diatomaceous silica (10), calcium carbonate (11), talc (12) and silica (13) for calcium silicate. These experiments were labeled C, D, E, F, G, H and I respectively. Small quantities of each of the above mixtures were coated on 3 × 3 inch polyethylene film and permitted to dry at ambient temperature for 7 days. The results of observations made after 7 days are reported below. Also 4.0 grams quantities of each of the above gelled emulsions were inserted into the center lower petals of an artificial polyethylene injection molded rose. These flowers were labeled and retained for olfactory testing by a panel of 10 individuals.

1. Proprietary fragrance oil
2. Plastanox 1161, phenolic phosphite, Am. Cyanamid Co., Bound Brook N. J.
3. Plastanox LTDP, dilaurylthrodioprionate, Am. Cyanamid Co., Bound Brook, N. J.

4. Cyasorb U.V. 531, 2-hydroxy-4-n-octoxybenzophenone, Am. Cyanamid Co., Bound Brook, N. J.
5. Allied Chem. Corp., Morristown, N. J., nonionic type emulsion, 25 percent solids.
6. Johns-Manville, N. Y., N. Y., Micro-Cel E, synthetic calcium silicate
7. Georgia Kaolin Co., Elizabeth, N. J., Glomax LL.
8. Georgia Kaolin Co., Elizabeth, N. J., Bentolite L.
9. Georgia Kaolin Co., Elizabeth, N. J., Clarolite T-60.
10. Johns-Manville, N. Y., N. Y., Celite 292, diatomaceous silica.
11. Precipitated calcium carbonate.
12. Georgia Kaolin Co., Elizabeth, N. J., Ceramic Talc.
13. Penn. Glass Sand Corp., Englewood Cliffs, N. J., Min-U-Sil.

Observations were made after 7 days of air drying at ambient temperature, of all the 3 × 3 inch polyethylene films. It was determined that the adhesion of the dried coatings to the film was good in all cases. An olfactory rating by a panel of ten individuals for each film A to I showed that the control A had a pleasant readily detectable rose fragrance but that film B with a coating containing Micro-Cel E (6) and film (F) with a coating containing Celite 292 (10) had perceptively more pronounced rose odor. The remaining films with the coatings also had slightly more rose odor than control A but were degraded lower than (B) and (F).

TABLE 1

Olfactory Rating of Artificial Roses Containing Emulsion Mixture A To I

| Months | 1 | 2 | 3 | 4 | 5 | 6 |
|---|---|---|---|---|---|---|
| A | ++++± | ++++± | +++ | +++ | ++± | ++ |
| B | ++++ | ++++ | ++++ | ++++± | ++++±++ | |
| C | ++++ | ++++± | ++++± | +++ | +++ | ++± |
| D | ++++ | ++++± | ++++± | +++ ± | +++ | ++± |
| E | ++++ | ++++ | ++++ | +++ | +++ | ++± |
| F | ++++ | ++++ | ++++ | ++++± | ++++±++ | |
| G | ++++ | ++++± | +++ | +++ | +++ | ++± |
| H | ++++ | ++++ | ++++ | +++ | ++± | ++± |
| I | ++++ | ++++ | ++++± | +++ | ++± | ++± |

Note:
++++ equals the highest rating
++ lowest acceptable, but still readily discernable pleasant odor

EXAMPLE 2

Two polyethylene aqueous rose oil emulsion mixtures were prepared: (A) containing an anionic polyethylene emulsion and (B) containing a cationic polyethylene emulsion. With the exception of the type of polyethylene emulsion used, each mixture was prepared by the same procedure as described for Example 1B.

A. This emulsion mixture was prepared using an anionic polyethylene emulsion (1). A coating of the gelled mixture was applied to a polyethylene film measuring 3 × 3 inches and permitted to dry for 7 days at ambient temperature. It was then determined that the rose oil fragrance was excellent and the adhesion of the dried coating to the polyethylene film was satisfactory. Slight rubbing flaked off some of the coating where it was in excess of 2 to 3 mm thick. Folding of the film only slightly cracked the coating.

B. The procedure described in (A) was used except that a cationic polyethylene emulsion was used. The dried coating on the film had a slight initial amine-like odor and the adhesion to the polyethylene film was less satisfactory than 2A or 1B. The dried coating had numerous radial cracks and flaked off quite readily when the film was folded.

It was apparent from observations made of the dried emulsion coating on the polyethylene test film that with respect to odor (olfactory testing performed by a panel of 10 individuals) adhesion to the film and cracking, that the anionic coating was best with the nonionic coating only slightly inferior and the cationic coating was determined to be less satisfactory with respect to the cracking of the dried emulsion coating, flaking and adhesion to the film.

EXAMPLE 3

Three rose oil polyethylene emulsions were prepared according to the procedure described in Example 1B. However, a mixture of 12.00 grams of the an anionic polyethylene emulsion and 6.00 grams of a polystyrene-maleic anhydride (1) (15 percent solids) aqueous solution was used in place of the 18.00 grams of polyethylene emulsion.

A. This emulsion was prepared using a mixture of 12.00 grams of an anionic polyethylene emulsion (2) and 6.00 grams of aqueous, 15 percent solids, styrene-maleic anhydride. The remaining components were the same used in Example 1. A coating of this emulsion was applied to a 3 × 3 inch polyethylene film and permitted to dry at ambient temperature for 4 days. The film was retained for olfactory testing and other observations. The center petals of a white artificial rose were coated with 4.0 grams of the emulsion.

B. This emulsion was prepared using 12.00 grams of a mixture of a cationic polyethylene emulsion (2) and 6.00 grams of aqueous, 15 percent solids, styrene-maleic anhydride solution. Similarly to (A) a polyethylene film was coated, dried and retained.

C. This emulsion was prepared using 12.00 grams of a mixture of a nonionic polyethylene emulsion (3) and 6.00 grams of aqueous, 15 percent solids, styrene-maleic anhydride. A coating of this emulsion was applied to a polyethylene film as previously described, and dried for 4 days.

Observations made for the 7 day dried and coated polyethylene films are tabulated in Table 2.

TABLE 2

| | Adhesion | Cracking | Peeling | Odor |
|---|---|---|---|---|
| A | Very good | Very good | Very good | Excellent |
| B | Fair | Marked | Poor | Slight (2) foreign |
| C | Good | Good | Fair | Very good |

Note: (1) With the exception of the olfactory testing performed by 10 individuals, the remaining observations were made by rubbing the dried coatings and folding the films.
(2) Odor good after 9 days.

EXAMPLE 4

To 10.00 grams of carnation perfume oil and 0.84 grams of lilac perfume oil was added 0.10 grams Plastanox 1161, 0.10 grams Plastanox LTDP and 0.10 grams Cyasorb. The components were warmed, with agitation for 10–15 minutes at 40°–45°C. This solution was designated IM (initial mixture). Then to 17.80 grams of a polyethylene nonionic type emulsion was added 1.60 grams of IM, 0.10 grams Micro-Cel E, 0.10 grams of short length fiber glass strands (1/16 – ¼ inch) and then a sufficient quantity of a blend of inorganic white and red pigments to give a resultant pink color. The mixture was then heated, with agitation, at 45°–50°C for about 20 minutes until a gel was formed. Then 3 × 3 inch polyethylene film strips were individually coated with a different adhesives (A, B, C, D, E, F, G, H) and the adhesive precoat was air dried for about 5–10 minutes at 50°–60°C. Over this dried precoat a coating 2–3 mm thick of the fragrance emulsion was applied and permitted to air dry at ambient temperature for 7 days. The results of observations made on these polyethylene film strips are recorded in Table 3.

Also the lower center petals of two pink artificial carnations were precoated respectively with Bostik and Aquaze. The precoatings were air dried at ambient temperatures and then 4.0 grams of the carnation emulsion were applied over the precoat area of each flower. The coated flowers were exposed to indirect daylight at 20°–25°C for a 10 month period. At the end of this period, olfactory ratings for each flower were recorded as 3+ (pleasant, natural-like and readily detectable). The adhesion of the emulsion coatings to the petals was rated satisfactory.

A. USM Corp. Chem. Div., Middletown, Mass., Bostik S7-1217 a water based vinyl pressure adhesive with about 56 percent solids.
B. Hercules, Inc., Wilmington, Delaware, Aquaze vinyl acetate-ethylene copolymer, aqueous with 55–57 percent solids.
C. W. R. Grace & Co., Cambridge, Mass., Daran X-800 a PVDC emulsion with 60–62 percent solids.
D. B. F. Goodrich Chem. Co., Cleveland, Ohio, Geon a vinyl chloride-acrylic latex with 51 percent solids.
E. B. F. Goodrich Chem. Co., Cambridge, Mass., Hycar a butadiene-acrylonitrile copolymer with 41 percent solids.
F. Eastman Chem. Products Inc., Kingsport, Tenn., Chlorinated Polyolefin, 50 percent solids in xylene.
G. Adhesive Products Corp., Bronx, N. Y. Polygriptex, aqueous resin dispersion.

1. Adhesion rated by rubbing the air dried coating. E (excellent), S (satisfactory) and U (unsatisfactory).
2. Peeling a combined rating based upon the ability to lift the dry coating from the polyethylene film. S (satisfactory), U (unsatisfactory).
3. Cracking of the dry coating was rated M (marked), S (some) and A (acceptable).
4. Odor rated by a panel of 10 individuals as previously described except that after 7 days the minimum acceptable rating was +++±

EXAMPLE 5

To 54.00 grams of aqueous nonionic type polyethylene emulsion was added a mixture containing 3.60 grams of rose oil fragrance, 0.30 grams Plastanox 1161, 0.30 grams Plastanox LTDP and 0.30 grams of Cyasorb U. V. 531. The mixture was heated, with agitation, at about 45°C, for 15 minutes. To this mixture white and yellow inorganic finely powdered pigments were added in sufficient quantity to give a light yellow hue. The entire mixture was divided into three equal parts. Part (A) was used as control. To part (B) was blended 0.70 grams of short strand fiber glass (1/16 – ¼ inch) and to part (C) was blended 0.20 grams of short strand asbestos. Coatings of (A) (B) and (C) were then applied to a depth of 2 to 3 mm to individual pieces of 3 × 3 inch polyethylene film and permitted to air dry at ambient temperature for 7 days. Examination of the coating on each film was then made and it was determined that the cracking of the dried coating was significantly less for (B) and (C) compared with (A). The dried film coating on (B) had the least cracking.

Application of an 4.0 gram sample of (A), (B) and (C) was made deep in the center petals of a white artificial injection molded polyethylene rose. The roses were retained, at ambient temperature, exposed to daylight for a 4 month period. Olfactory tests, by a panel of 10 individuals resulted in (B), (C) and (A) receiving a diminishing rating in the order listed.

EXAMPLE 6

In a manner similar to that described in Example 1, the following fruit, vegetable and shrub (tree) fragrance emulsions were prepared:

TABLE 4

|  | A | B | C | D | E | F | G | H |
|---|---|---|---|---|---|---|---|---|
| Grape [1] | 2.00 | | | | | | | |
| Strawberry [1] | | 2.00 | | | | | | |
| Peach [1] | | | 2.00 | | | | | |
| Apple spice [1] | | | | 2.00 | | | | |
| Lemon [1] | | | | | 2.00 | | | |
| Orange [1] | | | | | | 2.00 | | |
| Cucumber [1] | | | | | | | 2.00 | |
| Pine oil [1] | | | | | | | | 2.00 |
| Polyethylene emulsion [2] | 18.00 | 18.00 | 18.00 | 18.00 | 18.00 | 18.00 | 18.00 | 18.00 |
| Plastanox 1161 | 0.10 | 0.10 | 0.10 | 0.10 | 0.10 | 0.10 | 0.10 | 0.10 |
| Plastanox LTDP | 0.10 | 0.10 | 0.10 | 0.10 | 0.10 | 0.10 | 0.10 | 0.10 |
| Cyasorb UV 531 | 0.10 | 0.10 | 0.10 | 0.10 | 0.10 | 0.10 | 0.10 | 0.10 |
| Polysaccharide gum [3] | 0.10 | | 0.10 | 0.10 | 0.10 | 0.10 | 0.10 | 0.10 |
| Micro-Cel E | 0.10 | 0.10 | 0.10 | 0.10 | 0.10 | 0.10 | 0.10 | 0.10 |
| Fiber glass (1/16–¼″) [4] | | | | | | | 0.10 | |

[1] Proprietary fragrance oil.
[2] Allied Chemical Co. polyethylene nonionic aqueous emulsion. Note: All tabulated quantities in grams.
[3] Kelzon, Kelco Co., Clark, N.J.

TABLE 3

|  | Adhesion (1) | Peeling (2) | Cracking (3) | Odor (4) |
|---|---|---|---|---|
| A | S | S | S | ++++ |
| B | E | S | S | ++++ |
| C | U | U | M | +++ |
| D | U | U | M | +++± |
| E | U | U | M | +++± |
| F | S | S | A | ++ |
| G | S | S | A | +++ |

In the preparation of emulsion mixtures A through I, the procedure was similar to that described in Example 1, each mixture containing all the components was heated at 50°C for 15 to 20 minutes until a semi-gel formed.

Individual plastisol grapes and strawberries were then easily removed from the clusters and coated with Bostik adhesive, U. S. M. Corporation, Middleton, Mass., by spraying a small quantity of the adhesive emulsion through the cluster attachment opening. The fruit was then hot air dried at 50°–60° C for 30 minutes. Then about 4 ml of each of the grape (A) and the strawberry (B) emulsions were inserted through their respective openings and the fruits replaced on their original clusters.

The outside surface of a plastisol artificial peach, apple, lemon, orange and a cucumber were punctured and individually coated on the inside with a small quantity of Bostik and rotated while hot air drying at 50°–60°C for 30 minutes. Then about 5 ml of each of the emulsions mixtures, C through H, were inserted into their respective fruits and vegetable. The coated articles were slowly rotated, partially hot air dried, at 50°–60°C, for 15 minutes and then punctured with holes about 0.5 mm. in diameter. They were permitted to air dry and were retained for olfactory testing. The trunk of an approximately 3 foot artificial spruce tree was coated with Bostik and permitted to air dry. Then about 20 grams of emulsion mixture (I) was applied over the precoat and the coating was them permitted to air dry. The tree was retained for olfactory testing.

After 4 months exposure to indirect daylight in a room at temperature between 20° to 25°C, olfactory tests by a panel of 6 individuals resulted in a readily detectable and characteristic natural-like odor from all the retained articles.

EXAMPLE 7

A. To 1.50 grams of jasmin oil (1) was added 0.15 grams of plastanox 1161, 0.15 grams Plaxtanox LTDP and 0.10 grams and Cyasorbe U.V.531. The mixture was warmed at 40°–45°C, with agitation to effect solution and then 18.00 grams of a nonionic type polyethylene emulsion was added. To this mixture was added 0.10 grams of fiber glass (1/16 – ¼ inch). The entire mixture was heated at 40°–45° C for 15–20 minutes until a gel formed.

B. A similar mixture to that described in (A) was prepared and into this mixture was blended 0.20 grams Micro-Cel E (2).

C. To another mixture similar to (A) was added 0.20 grams of short-fiber asbestos (3).

A 4.0 gram sample of each of the above gelled emulsion mixtures was inserted deep into the center petals of an artificial polyethylene injection molded gardenia flower. Prior to the insertion of the gelled emulsion the center petals of each artificial were precoated with Aquaze adhesive and the coating was dried for several minutes at 50°C. The flowers containing the emulsion were kept at ambient temperature, exposed to indirect daylight for 6 months. Olfactory testing by a panel of 10 individuals, at the end of this period, rated (A) as +++±, (B) as ++++± and (C) as +++.

EXAMPLE 8

To 9.23 grams of rose oil was added 0.10 grams of Plastanox 1161, 0.10 grams of Plastanox LTDP and 0.10 grams of Cyasorb U. V. 531. The mixture was warmed with agitation for 10–15 minutes, at 40°–45°C to effect solution. This mixture was then added to 2.30 grams of Micro-Gel E and mixed until an essentially dry powder was obtained. This mixture was labeled IM (initial mixture). Then to a mixture containing 12.00 grams of an aqueous anionic polyethylene emulsion, 8.00 grams of a 15 percent aqueous styrene-maleic abydride copolymer emulsion, 0.30 grams of short strand fiber glass (1/16 – ¼ inch) and sufficient inorganic white and yellow pigments to give a desired yellowish hue, was added to 1.60 grams of IM. The entire mixture was heated with agitation at 35°–40°C for 15 minutes until a gel formed. Exactly 5.0 grams of this mixture was inserted deep into the center petals of a white artificial injection molded polyethylene rose. The center petals were first precoated with Bostik and air dried at 50°–60°C. The rose (A) was retained for olfactory testing.

B. A control emulsion mixture was prepared as described in (A) except 20.00 grams of a nonionic type aqueous polyethylene emulsion was used in place of the 12.00 grams of the above anionic type polyethylene emulsion and 8.00 grams of the copolymer emulsion. A white artificial rose was first precoated with Bostik and then 5.0 grams of the fragrance emulsion mixture was applied as described for (a).

Both coated artificial flowers were retained at ambient temperature, exposed to air and indirect daylight for 10 months. Olfactory testing, at the end of this period, by a panel of 10 individuals, rated (A) as +++ and B as ++.

EXAMPLE 9

A. A 16.00 gram sample of jasmin oil (1) was mixed with 0.60 grams of an anionic surfactant (2), 0.60 grams of Plastanox 1161, 0.60 grams of Plastanox LTDP and 0.60 grams of Cyasorb U.V. 531. The mixture was warmed at 40°C for 15 minutes to effect solution and then blended with 25.00 grams of powdered polyethylene. This blend was then thoroughly mixed with 175.00 grams of polyethylene and placed in the hopper of a McNeil Akron reciprocating rotary screw molding machine. The mixture was injection molded, with the front and rear temperatures of the machine maintained at about 400° F and the pressure at at 600–700 psi. Initial pieces through the machine were discarded to purge the equipment. A series of 25 molded pieces weighing about 4 grams each and measuring approximately 2 inches by 0.5 inches and 0.25 inches in thickness were retained. One face of these injection molded pieces had a scroll design.

B. In a manner similar to that described in (A) 16.00 grams of jasmin oil were mixed with the same quantities of surfactant, antioxidants and ultra-violet radiation absorber. However, after warming the mixture, the solution was then thoroughly blended with 6.00 grams of Micro-Cel E (3). This blend was then thoroughly mixed with 25.00 grams of powdered polyethylene. In turn this mixture was blended with 175.00 grams of polyethylene and injection molded as previously described. The molded objects (B) were retained for olfactory testing.

C. A similar run to that described in (B) was made, with the exception that Kaolin (4) was substituted for the synthetic calcium silicate (Micro-Cel E). The injection molded objects (C) were retained for olfactory testing.

D. A similar run to that described in (B) was made, with the exception, that a uniform micron size silica (5) was substituted for the diatomaceous earth. The injection molded objects were retained for olfactory testing.

E. A similar run to that described in (B) was made, with the exception that talc (6) was substituted for the diatomaceous earth. The injection molded objects were retained for olfactory testing.

F. A similar run to that described in (B) was made, with the exception that calcium carbonate (7) was substituted for the diatomaceous earth. The injection molded objects were retained for olfactory testing.

Samples from each run were retained for twelve months, exposed to air and indirect daylight at ambient temperature (20–25°C). Olfactory tests, at the end of this period, by a panel of 10 individuals rated (B) containing the Micro-Cel E as best, with the still pleasant fragrance from (A) still readily detectable, but not as good as (B). Ratings for (C), (D), (E) and (F) were comparable. They were better than (A) but not as good as (B).

1. Proprietary fragrance oil
2. Witco Chem. Corp., N.Y., N.Y., Emcol 4600
3. Johns-Manville, N.Y., N.Y., Micro-Cel E synthetic calcium silicate
4. Georgia Kaolin Co., Elizabeth, N.J., Glomax LL
5. Penn. Glass Sand Corp. Englewood Cliffs, N.J., Min-U-Sil
6. Georgia Kaolin Co., Elizabeth, N.J., Ceramic Talc
7. Recipitated Calcium carbonate.

EXAMPLE 10

A series of emulsion mixture was prepared in order to determine the adhesive and other characteristics of the air dried emulsion coating to a polyethylene film (3×3 inches) or a plastisol 1 inch sq. The emulsion mixture, in each case, was applied to the substrate to a depth of approximately 2 mm, wet. The coating was permitted to air dry at ambient temperature (20°–25°C) for 7 days. The composition of the various mixtures and the test results are tabulated in Table 5.

TABLE 5

| Components (grams) | A | B | C | D | E |
|---|---|---|---|---|---|
| Orange Oil (1) | 4.25 | — | 4.25 | — | — |
| Strawberry Oil (1) | — | 4.25 | — | — | — |
| Rose Oil (1) | — | — | — | 2.50 | 2.00 |
| Rose Oil Mixture (2) | — | — | — | 4.50 | — |
| Polyethylene (3A) | — | — | 5.00 | 24.00 (3B) | 5.00 |
| SMA 3000 A (4) | — | — | — | 16.00 | — |
| Bostik (5) | 10.00 | — | — | — | 5.00 |
| Aquaze (6) | — | 10.00 | 5.00 | — | — |
| Plastanox 1161 | 0.10 | 0.10 | 0.10 | — | 0.10 |
| Plastanox LTDP | 0.10 | 0.10 | 0.10 | — | 0.10 |
| Cyasorb UV 531 | 0.10 | 0.10 | 0.10 | — | 0.10 |
| Polysaccharide (7) | — | — | 0.10 | — | — |
| Celite 292 (8) | 0.20 | 0.20 | 0.20 | — | 0.20 |
| Fiber Glass (1/16×¼") | 0.20 | 0.20 | 0.20 | 0.60 | 0.20 |
| Adhesion, Polyethylene (9) | VS | V.S | S | S | S |
| Adhesion to Plastisol (10) | VS | V.S | S | S | S |
| Odor (11) | +++± | +++± | ++++ | +++ | +++± |

1. Proprietary fragrance oil
2. Prepared as described in Example 8A for the initial mixture (IM).
3A. Nonionic type aqueous polyethylene emulsion.
3B. Anionic type aqueous polyethylene copolymer emulsion.
4. Aqueous 15 percent solids emulsion of styrene-maleic anhydride copolymer.
5. USM Corp., Middleton, Mass., aqueous modified vinyl acetate emulsion.
6. Herculer Inc., Wilmington, Delaware, aqueous vinyl acetate-ethylene copolymer emulsion.
7. Kelco Co., Clark, N. J., Kelzon.
8. Johns-Manville, N. Y., N. Y., diatomaceous silica.
9. Adhesion to polyethylene film VS (very satisfactory), S (satisfactory), U (unsatisfactory).
10. Adhesion to plastisol square, same symbols as used for (9).
11. Odor determined by a panel of 10 individuals with ++++ indicating highest rating and less than ++ being unsatisfactory and not readily dectable.

EXAMPLE 11

A. The inside bottom of a small injection molded polyethylene pot containing a small bouquet of artificial roses was precoated with Bostik and the precoat hot air dried at 50°–60°C for 10 minutes. Over this precoating was applied 7.0 grams of emulsion mixture (D) prepared in Example 10. This coating was air dried for 7 days and then permitted to remain exposed to the air at 20°–28°C in indirect daylight for 4 months. An olfactory test by a panel of 10 individuals rated the rose fragrance +++.

B. Similarly the inside bottom of a small injection molded polyethylene bowl containing several clusters of artificial strawberries was coated with 4.0 grams of emulsion mixture (B) prepared in Example 10. No precoating was necessary with this emulsion. After air drying the coating for 4 days, the strawberry clusters were replaced in the bowl and the bowl was permitted to remain exposed to the air at 20°–25°C for 4 months. The olfactory rating was performed as described above and the rating of the strawberry fragrance from the bowl was ++++±.

What is claimed is:

1. A process for imparting natural-like heat sensitive fragrance essential oils of long duration to a polymeric artificial flora product substrate of injection or blow-molded polyethylene or cast or molded plastisol flowers, fruits, vegetables, shrubs, trees or container pots, and bowl holders therefor which comprises coating said polymeric artificial floral product substrate at a temperature sufficiently low enough to minimize degradation or alteration of desirable and acceptable olefactory characteristics of said fragrant oil with an aqueous polyethylene or polyethylene co-polymer emulsion consisting essentially of sufficient finely divided inorganic pigment to give a pre-determined color hue to the dried polymer coating, from 1 percent to 45 percent by weight of a fragrance oil, 10 to 65 percent by weight concentration of polymer or copolymer in the aqueous emulsion, and 0.25 to 10 percent by weight concentration of finely divided 1 to 50 microns absorbents providing a platform for the gradual vaporization of the fragrance essential oil, said absorbents creating additional voids in the dried polymeric coating, thereby permitting improved permeation of the fragrance vapor rough the coating.

2. A process according to claim 1 wherein said pigmented coating is applied to the outside surface of an injection molded solid polyethylene or vinyl or inside surface of a hollow plastisol artificial flora substrate.

3. A pigmented color coated polymeric product as obtained by the process of claim 1.

4. A pigmented color coated polymeric product according to claim 1 which is an artificial flower.

* * * * *